United States Patent
Werner et al.

(10) Patent No.: US 10,047,619 B2
(45) Date of Patent: Aug. 14, 2018

(54) SEAL CONFIGURATION FOR A TURBO MACHINE

(71) Applicant: MTU Aero Engines AG, Munich (DE)

(72) Inventors: Andre Werner, Munich (DE); Stephan Klaen, Berlin (DE); Manuel Hertter, Munich (DE); Frank Stiehler, Bad Liebenwerda (DE)

(73) Assignee: MTU Aero Engines AG, Munich (DE)

( * ) Notice: Subject to any disclaimer, the term of this patent is extended or adjusted under 35 U.S.C. 154(b) by 385 days.

(21) Appl. No.: 14/532,822

(22) Filed: Nov. 4, 2014

(65) Prior Publication Data

US 2015/0125278 A1 May 7, 2015

(30) Foreign Application Priority Data

Nov. 6, 2013 (DE) .................. 10 2013 222 514

(51) Int. Cl.
| | | |
|---|---|---|
| *F01D 11/00* | (2006.01) | |
| *F01D 25/00* | (2006.01) | |
| *F01D 11/02* | (2006.01) | |
| *F16J 15/3288* | (2016.01) | |

(52) U.S. Cl.
CPC .......... *F01D 11/001* (2013.01); *F01D 11/025* (2013.01); *F01D 25/005* (2013.01); *F16J 15/3288* (2013.01); *F05D 2240/56* (2013.01)

(58) Field of Classification Search
CPC .... F16J 15/3288; F01D 11/025; F01D 11/001
See application file for complete search history.

(56) References Cited

U.S. PATENT DOCUMENTS

| | | | | |
|---|---|---|---|---|
| 3,383,033 A | | 5/1968 | Moore | |
| 5,351,971 A | * | 10/1994 | Short | F16J 15/3288 277/355 |
| 7,105,219 B2 | * | 9/2006 | Ohara | B23K 1/0014 156/89.22 |
| 8,034,153 B2 | * | 10/2011 | Marchiando | B22F 3/115 419/12 |
| 9,346,131 B2 | | 5/2016 | Waltemathe et al. | |
| 2003/0193146 A1 | * | 10/2003 | Addis | F16J 15/3288 277/355 |
| 2005/0040602 A1 | | 2/2005 | Beichl et al. | |
| 2007/0132189 A1 | | 6/2007 | Short et al. | |
| 2009/0263233 A1 | | 10/2009 | Guemmer | |

(Continued)

FOREIGN PATENT DOCUMENTS

| | | |
|---|---|---|
| DE | 69111128 | 11/1995 |
| DE | 102008014957 | 9/2009 |

(Continued)

*Primary Examiner* — Logan Kraft
*Assistant Examiner* — Sabbir Hasan
(74) *Attorney, Agent, or Firm* — Davidson, Davidson & Kappel, LLC

(57) ABSTRACT

A seal configuration (100) for a turbo machine having a rotor (5), wherein the seal configuration (100) has a sealing element (300) to create a seal with respect to the rotor (5) in an installed position and a supporting device (200). The supporting device (200) has, in at least one section of the supporting device, a material (9) that melts when it comes into contact with the rotating rotor (5) in the installed position. A turbo machine having a seal configuration (100) is also provided.

14 Claims, 1 Drawing Sheet

(56) References Cited

U.S. PATENT DOCUMENTS

2009/0301102 A1   12/2009   Clemen et al.
2013/0280046 A1   10/2013   Morel et al.

FOREIGN PATENT DOCUMENTS

| DE | 102008027021 | 12/2009 |
| DE | 102010026048 | 1/2012 |
| EP | 0453315 | 7/1955 |
| EP | 1018613 | 7/2000 |
| EP | 1331423 | 7/2003 |
| EP | 1353097 A2 | 10/2003 |
| EP | 2110559 | 10/2009 |
| FR | 2970302 | 7/2012 |
| GB | 219 2229 | 1/1988 |
| GB | 2388875 | 11/2003 |
| WO | WO9205378 | 4/1992 |

* cited by examiner

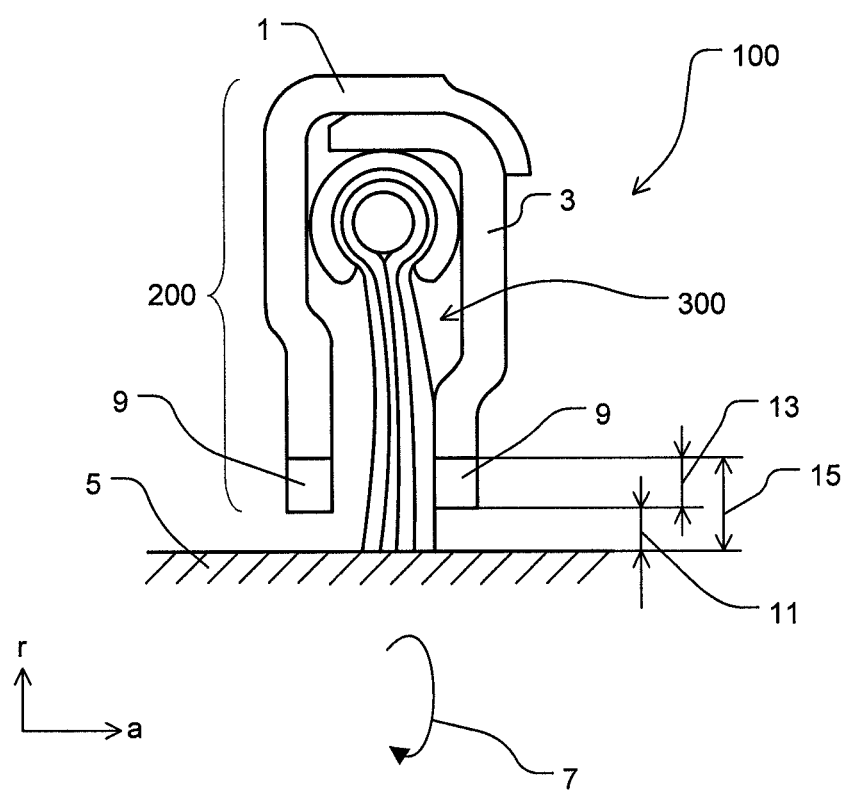

SEAL CONFIGURATION FOR A TURBO MACHINE

This claims the benefit of German Patent Application DE 102013222514.8, filed Nov. 4, 2013 and hereby incorporated by reference herein.

The present invention relates to a seal configuration for a turbo machine.

BACKGROUND

Different seals, sealing systems and seal configurations are used in turbo machines. Examples include labyrinth seals or contact seals between rotating and static parts, bearing seals or static seals. A failure of the seal caused by extreme operating conditions such as the result of severe deflections of rotor or stator elements may result in contact between the rotor and the retaining or supporting elements of the seal configuration. This contact may cause significant damage inside and outside the turbo machine, for example as the result of fragments that break off the seal configuration.

SUMMARY OF THE INVENTION

An object of the present invention is a seal configuration for a turbo machine having a rotor that minimizes the risks and potential damage in a turbo machine when extreme operating conditions caused by severe deflections of rotor elements occur and result in contact between the rotor and retaining or supporting elements of the seal configuration.

The present invention provides a seal configuration for a turbo machine. The seal configuration has at least one sealing element to create a seal with respect to a rotor of the turbo machine and a supporting device. The seal configuration according to the present invention, when installed, is situated in the turbo machine. The supporting device has, in at least one section of the supporting device, a material that, in the installed position, melts when it comes into contact with the rotating rotor.

In all the preceding and following remarks, the use of the expression, "may be" or "may have" etc. is to be considered synonymous with "is preferably" or "has preferably" etc. respectively, and is intended to explain specific embodiments of the present invention.

Whenever numbers or numerical terms are used in this application, a person skilled in the art will understand them to be an indication of a numerical lower limit. Provided that this does not result in any contradiction that is apparent to those skilled in the art, those skilled in the art will therefore always interpret the indication "one" to mean "at least one". This understanding is encompassed by the present invention, as is the interpretation that a number such as "one" may be alternatively interpreted as "exactly one," wherever that is obviously technically possible to those skilled in the art. Both interpretations are encompassed by the invention and apply to all the numerical terms used in this application.

The specific embodiments according to the present invention may have one or multiple features cited below.

In some of the specific embodiments according to the present invention, the turbo machine is an axial turbo machine, in particular an aircraft engine.

In certain specific embodiments according to the present invention, the seal configuration is an overload rubbing system, in particular for brush seals. In aircraft engines, for example, an overload situation may occur during extreme operating conditions. Operating conditions of this type may be fault conditions, e.g. in the event of a defective individual part in an aircraft engine, or special cases.

In some of the specific embodiments according to the present invention, the seal configuration is a slide seal, a brush seal, a labyrinth seal or another type of seal configuration or sealing system.

In certain specific embodiments according to the present invention, the supporting device has at least one supporting ring and one cover ring. In particular, the supporting device extends in essentially the radial direction with reference to the center axis of the turbo machine. The supporting ring and the cover ring are in particular situated in an annular fashion around the center axis of the turbo machine. The supporting ring and the cover ring may be segmented in the peripheral direction, for example in the form of two (180°), three (120°), four (90°) or more segments over the periphery.

In certain specific embodiments according to the present invention, the sealing element is appropriate for sealing a gap, in particular a radial gap, between the supporting device and the rotor of the turbo machine. A gap of this type may in particular minimize flow losses. Flow losses may result from the fact that the flowing medium does not flow through the guide and moving blades but through gaps between the shaft and the guide wheels and/or through gaps between the blade wheels and the housing.

The term "rotor," as it is used in this application, means in particular a shaft of the turbo machine, whereby a plurality of rotors may be situated on the shaft. The rotor may also have surface areas that are particularly suitable for sealing with respect to sealing elements, in particular brush seals. Surface areas of this type may be hardened and/or surface-polished and/or surface-coated.

In some specific embodiments according to the present invention, the rotor rotates during normal operation of the turbo machine in particular. Normal operation has in particular characteristic load cases, such as, during flight, for example on ascent, on descent and flight at cruising altitude. The rotor may also rotate without a load, or at least essentially without a load, during idling or during a test run.

The term "melt" as it is used in this application, means in particular a melting of the material according to the present invention that is present in at least one section of the supporting device, when it is in contact with the rotating rotor in the installed position. A melting or softening of this material means the direct transition of the material from the solid state into the liquid state of aggregation.

In particular, in some specific embodiments according to the present invention, the temperature required for the melting or softening may be generated by contact with the rotor. For example, in the event of jerky contact of the rotating rotor with the material, such as in the event of damage caused by an imbalance as a result of mechanical forces on the rotor, the energy of the impact is transformed into heat and the material melts.

In certain specific embodiments according to the present invention, the seal configuration is designed to be situated on a radially inner end of a guide wheel of the turbo machine.

In certain specific embodiments according to the present invention, the meltable material is situated on a radially inner end of the supporting device in the installed position.

In some specific embodiments according to the present invention, the sealing element is a brush seal.

In some specific embodiments according to the present invention, the material has a melting point between approximately 800° C. and approximately 1100° C.

In certain specific embodiments according to the present invention, the material is a self-fluxing alloy or a nickel-based brazing alloy.

The term "self-fluxing alloy" as used in this application means alloys that are deposited or coated onto another material, in particular by thermal spraying methods, and have "self-fluxing" properties during the application process. These "self-fluxing" properties may be achieved in particular when the alloy is nickel-based. Alloys with the base element nickel (Ni) advantageously have good mechanical properties, high corrosion resistance and good machinability.

In certain specific embodiments according to the present invention, the material is bonded to the supporting ring with the aid of thermal spraying, brazing or welding. Thermal spraying processes include, for example, cold gas spraying or High Velocity Oxygen Fuel (HVOF) spraying. One brazing process that may be used is surfacing by brazing. Examples of welding processes include build-up welding or generative fabrication processes such as, for example, selective laser melting (SLM).

In some specific embodiments according to the present invention, the material bonded to the supporting ring has a minimum height or a minimum deposit height in the radial direction of approximately 0.5 mm with reference to the center axis or the axis of rotation of the rotor shaft.

In some specific embodiments according to the present invention, the material is a nickel alloy with a low melting point having either phosphorus or boron and silicon.

In certain specific embodiments according to the present invention, the material is a self-fluxing, low-melting-point nickel alloy having at least boron, silicon and carbon.

The alloy elements boron and silicon may be advantageously used and added to obtain the properties of self-fluxing nickel alloys or nickel-based hard alloys. In particular, the alloy elements boron and silicon may be advantageously used to lower the melting point of nickel alloys or nickel-based hard alloys.

Potential alloys having low melting points are cited below, although the invention is not restricted to these examples:

| Designation | Producer designation | Chem. composition (Percent by weight; wt. %) |
|---|---|---|
| Ni basis with phosphorus alloy (System Ni—Cr—P) | | |
| B—Ni6 | Amdry 766 | Ni—11P |
| B—Ni7 | Amdry 767 | Ni—14Cr—10P |
| Ni basis with B—Si alloy (System Ni—Fe—Cr—B—Si) | | |
| B—Ni1 | Amdry 750 | Ni—14Cr—5Si—4Fe—3.3B |
| B—Ni2 | Amdry 770 | Ni—7Cr—4.5Si—3Fe—3B |
| B—Ni3 | Amdry 780 | Ni4.5Si—3.2B |
| B—Ni4 | Amdry 790 | Ni—3.5Si—2B |
| B—Ni9 | Amdry 775 | Ni—15Cr—3B |

| Ni base with B—Si—C alloy (Ni—Fe—Cr—B—Si—C System) self-fluxing alloy | |
|---|---|
| Producer designation | Chem. composition (Percent by weight; wt. %) |
| Melco 14E | Ni—11Cr—3.7Si—2.75Fe—2.2B—0.5C |
| Melco 15E/F | Ni—17Cr—4Si—4Fe3.5B—1C |
| Melco 20 | Ni—16Cr—4.5Si—4Fe—3.5B—0.6C |

Example : Ni-14Cr-5Si-4Fe-3.3B

Nickel-base alloy having 14 percent by weight (wt. %) chromium, 5 wt. % silicon, 4 wt. % iron (Fe) and 3.3 wt. % boron.

In some specific embodiments according to the present invention, the content of boron in the nickel-base alloy is between 2 wt. % and 4 wt. %, the content of silicon is between 2 wt. % and 5 wt. % and the chromium content is between 5 wt. % and 17 wt. %.

In certain specific embodiments of the present invention, the supporting device is made entirely out of the melting material, in particular of a material having a low melting point.

In certain specific embodiments of the present invention the sealing element, when installed, is in contact at least in some sections with the material in the axial direction.

Many or all of the specific embodiments according to the present invention may have one, several or all of the advantages described above and/or below.

The seal configuration according to the present invention has the advantage that it makes it possible to prevent severe heating of the seal configuration when the supporting device comes in contact with the rotor, in particular during under overload conditions. In particular when the supporting device has a material with a low melting point, at least in some sections, and in the installed position the material melts when it comes into contact with the rotating rotor, the melted material may advantageously be spun off. This spinning-off reduces the load on the contact area between the rotor and the support device, thereby making it possible to advantageously prevent overheating or damage to the rotor.

BRIEF DESCRIPTION OF THE DRAWINGS

The present invention is explained in greater detail below on the basis of the specific embodiments illustrated in the attached drawing, in which the same or similar components are identified by identical reference numbers. In the simplified schematic FIGURE:

FIG. 1 shows a side view of a seal configuration according to the present invention.

DETAILED DESCRIPTION

FIG. 1 shows a seal configuration 100 according to the present invention as an overload rubbing system having a brush seal 300.

Seal configuration 100 has a supporting device 200 and a sealing element 300 (in this case a brush seal 300). Supporting device 200 has a cover ring 1 and a supporting ring 3. Sealing element 300 is fixed in supporting device 200.

Seal configuration 100 is arranged in annular fashion around rotor 5. The direction of rotation of the rotor is indicated by arrow 7. Seal configuration 100 or individual areas of it, such as cover ring 1 and/or supporting ring 3, for example, may be segmented over the periphery.

Seal configuration 100 is situated in particular on the radially inner end of a guide wheel (not shown in FIG. 1).

Brush seal 300 is fastened or fixed between cover ring 1 and supporting ring 3 with the aid of a mechanical clamp.

Meltable material 9 according to the present invention is situated on the radially inner end of both of cover ring 1 and of support ring 3. Material 9 is deposited in particular on cover ring 1 and supporting ring 3 with the aid of a thermal spraying process.

In the illustrated installed position of the sealing system according to the present invention (or in normal operation of the turbo machine), a gap 11 is formed between the radially inner end of cover ring 1 and of support ring 3 on the one hand and rotor 5 on the other hand. Height 13 of the melting material in the radial direction r has in particular a minimum height of 0.5 mm.

The sum of the height of gap 11 in the radial direction and radial height 13 of the melting material 9 is called an overload overlay 15. In the case of an overload, e.g. under extreme operating conditions of aircraft engines, severe deflections of rotor 5 may occur in radial direction r. If these deflections are less than the height of gap 11, these operating conditions are not critical. If, however, the deflections exceed gap height 11, the seal configuration according to the present invention results in a melting of material 9, in particular when material 9 has a low melting point. When material 9 melts in the event of an overload, the material may be spun off and thus reduce the load on the area in which rotor 5 is in contact with material 9. That may in turn prevent a potentially serious overheating and damage to rotor 5.

NOMENCLATURE

100 Seal configuration
200 Support device
300 Sealing element; brush seal
a axial; axial direction
r radial; radial direction
1 Cover ring
3 Support ring
5 Rotor
7 Direction of rotation of the rotor
9 Meltable material
11 Gap between cover ring/supporting ring and rotor
13 Radial height of the meltable material
15 Overlay (in the event of an overload)

The invention claimed is:

1. A seal configuration for a turbo machine having a shaft, the seal configuration being ring-shaped and comprising:
   a seal element to provide a seal with respect to the shaft when installed; and
   a ring-shaped support device, the support device having a material at a radial inner end, the material having a melting point between 800° C. and 1100° C. such that, when installed, the material melts when coming into contact with the rotating shaft;
wherein the material is a self-fluxing alloy or a nickel-base brazing alloy.

2. The seal configuration as recited in claim 1 wherein the seal element is a brush seal.

3. The seal configuration as recited in claim 1 wherein the material is bonded to the support device with the aid of thermal spraying, brazing or welding.

4. The seal configuration as recited in claim 1 wherein the material bonded to the support device has a minimum height of 0.5 mm in the radial direction.

5. The seal configuration as recited in claim 1 wherein the material is a self-fluxing, low-melting-point nickel alloy having at least boron, silicon and carbon.

6. The seal configuration as recited in claim 1 wherein the seal element, in the installed position, is situated so that at least in some sections it is in contact with the material in an axial direction parallel to a central axis of the seal configuration.

7. A turbo machine comprising the seal configuration as recited in claim 1.

8. The seal configuration as recited in claim 1 wherein the support device has a cover ring and a support ring, both the cover ring and the support ring having the material at the radial inner end.

9. The seal configuration as recited in claim 1 wherein the material is a nickel alloy having phosphorus.

10. The seal configuration as recited in claim 1 wherein the material is a nickel alloy having boron and silicon.

11. The seal configuration as recited in claim 1 wherein the material is selected from the group consisting of Ni-11Cr-3.7Si-2.75Fe-2.2B-0.5C, Ni-17Cr-4Si-4Fe3.5B-1C, Ni-16Cr-4.5Si-4Fe-3.5B-0.6C, and Ni-14Cr-5Si-4Fe-3.3B.

12. The seal configuration as recited in claim 1 wherein the material is selected from the group consisting of Ni-11P and Ni-14Cr-10P.

13. The seal configuration as recited in claim 1 wherein the material is selected from the group consisting of Ni-14Cr-5Si-4Fe-3.3B, Ni-7Cr-4.5Si-3Fe-3B, Ni4.5Si-3.2B, Ni-3.5Si-2B, and Ni-15Cr-3B.

14. A seal configuration for a turbo machine having a shaft, the seal configuration being ring-shaped and comprising:
   a seal element to provide a seal with respect to the shaft when installed; and
   a ring-shaped support device, the support device having a material at a radial inner end, the material having a melting point between 800° C. and 1100° C. such that, when installed, the material melts when coming into contact with the rotating shaft;
wherein the material is a nickel alloy having phosphorus or a combination of boron and silicon.

* * * * *